UNITED STATES PATENT OFFICE.

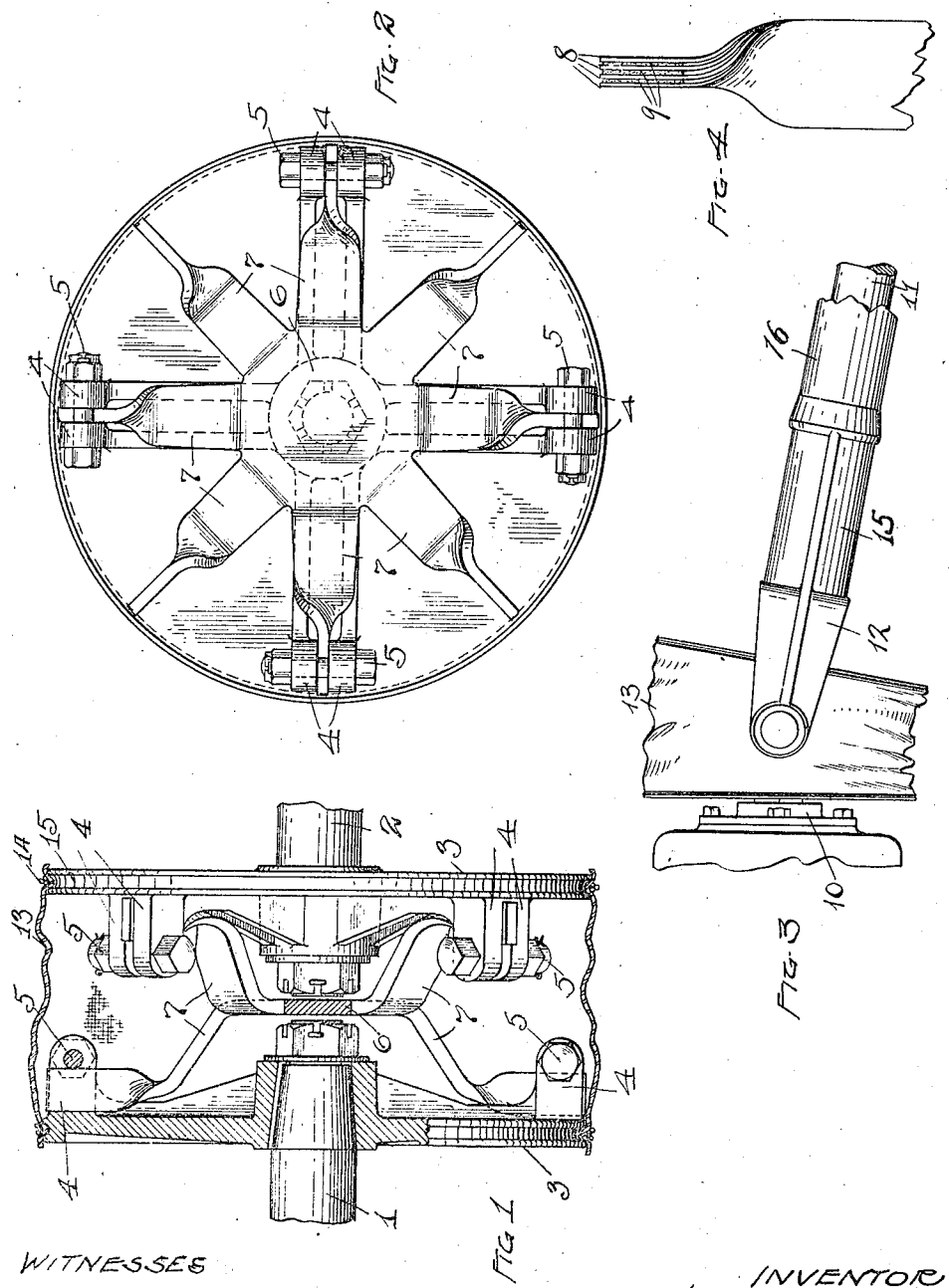

HAROLD A. SOULIS, OF BROOKLYN, NEW YORK, ASSIGNOR OF ONE-HALF TO WILBUR T. SOULIS, OF BROOKLYN, NEW YORK.

UNIVERSAL COUPLING.

1,191,242.      Specification of Letters Patent.      Patented July 18, 1916.

Application filed May 1, 1914. Serial No. 835,605.

*To all whom it may concern:*

Be it known that I, HAROLD A. SOULIS, a citizen of the United States, and a resident of Brooklyn, county of Kings, and State of New York, have invented a new and useful Improvement in Universal Couplings, of which the following is a specification, the principle of the invention being herein explained, and the best mode in which I have contemplated applying that principle, so as to distinguish it from other inventions.

The present improvements relate to a universal joint adapted to be interposed between adjacent shaft sections for the purpose of transmitting power from one section to the other when such sections are out of alinement.

In particular the improvements have to deal with a flexible universal coupling which will absorb the shocks incident to the starting and stopping of the shafts and which will give a continuous and even speed of rotation of the driven member irrespective of the particular angular relation of the two shafts.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing: Figure 1 is a side elevation illustrating the use of my device in connection with two adjacent shafts, showing the device partially in section; Fig. 2 is a front elevation of the connecting member; Fig. 3 is a side elevation illustrating the method of connection of my improved joint between two shaft sections; and Fig. 4 is a side elevation of a slightly modified form of connecting member which may be used if desired.

In Fig. 1 there is shown a driving element or shaft 1 adjacent to which is a driven element or shaft 2. It will be understood that the driving and driven elements may not be in the precise form of shafts as shown, as the present invention may equally well be used with other forms of driving members. Such shafts 1 and 2 have their ends adjacent, but such shafts are not normally alined with each other, the shafts lying at various angles during operation as illustrated in Fig. 3. Upon each such shaft end there is fixedly mounted a disk 3, each such disk being provided with a plurality of pairs of outstanding lugs 4. There are preferably provided four such pairs of lugs which are spaced at equal intervals around the outside of the disks and upon the adjacent faces of the same. The disks are assembled upon the shafts in such relation that the pairs of lugs alternate about the shafts as indicated in Fig. 1. These lugs are preferably apertured for the reception of bolts 5.

Disposed between the ends of the two shafts 1 and 2 is a plate or disk 6 provided with a plurality of radially disposed arms 7. The alternate ones of such arms extend on opposite sides of the plane of such disk 6, there being preferably eight arms in all, four on each side. The form of the arms is best shown in Fig. 1, and it will be noticed that each arm is twisted through substantially 90° adjacent its outer end, thus adapting such end to be received between a pair of lugs 4 where it may be clamped by means of the bolt 5 which passes through the lugs 4.

The disk 6 and the arms 7 are formed of thin relatively flexible material thus permitting the arms to bend under the driving strain and to secure rotation of the driven shaft upon rotation of the driving shaft irrespective of the angular relation between said two shafts. The ends of the arms are twisted through 90° for the purpose of securing greater flexibility and resiliency in the connecting member, as the starting shock is now received by the arms in such a way as to cause the ends of the same to bend with respect to the remainder of the arm, thus absorbing the shock without transmitting the same through the arms to the driven shaft.

In many cases it may be desirable to secure a greater flexibility than is possible with a connecting disk in which the arms and disk are formed of a single integral piece of metal, and in such case I provide a built up or laminated connecting member formed of a plurality of thin sheets of metal 8, as shown in Fig. 4, which may be suitably connected together at their center. In case such a construction is used, the ends of the arms are preferably separated by thin strips 9 of compressible material, thus providing each lamination of each arm with a certain amount of play which materially assists in absorbing the shock at starting.

As has already been stated the present invention may be used in connection with any two driving elements, and is not limited to the specific type of members which are here shown. In order, however, to show the device in one connection I have shown in Fig. 3 a driving shaft 10 which is, by means of the present device, connected to a driven shaft 11 having an angularity of about 10°, which is substantially that of an automobile propeller shaft, in which field the present device will find a large use. In such a combination a torque tube 16 inclosing the driven shaft may be provided, if desired, with a yoke 12 which may be suitably mounted in any desired manner upon the frame of the vehicle. It will be understood that wherever necessary the connecting plate, disks and arms may be covered by a suitable jacket 13, preferably of leather or some similar material, such jacket being held to each of the plates by means of a suitable attaching cord or cable 14 which is received in a groove 15, formed around the plate.

By giving the arms 7 a bend of the angularity indicated it is possible for the shafts to assume a relation in which their axes do not intersect on the center line of the universal; this wide range of movement renders the assembly easier and permits slight wear of the bearings for the two shafts.

Other modes of applying the principle of my invention may be employed instead of the one explained, change being made as regards the mechanism herein disclosed provided the means stated by any of the following claims or the equivalent of such stated means be employed.

I therefore particularly point out and distinctly claim as my invention:—

1. The combination with two shafts having adjacently disposed ends; of a member disposed between such ends and having flexible arms formed integral therewith and extending alternately to either side of the plane of said member, each of such arms being connected to the adjacent one of such shaft ends, and such arms being disconnected from each other at their outer ends.

2. The combination with two shafts having adjacently disposed ends; of a plate-like member disposed between such ends and having radially extending flexible arms formed integrally therewith, such arms extending alternately to either side of the plane of said plate-like member, each of such arms being connected to the adjacent one of such shaft ends, and such arms being disconnected from each other at their outer ends.

3. The combination with two shafts having adjacently disposed ends; of disks mounted upon the ends of said shafts; and a plate disposed between such ends and having radially extending flexible arms formed integrally therewith and extending alternately to either side of said plate, each of such arms being twisted and attached to the adjacent one of said disks.

4. The combination with two shafts having adjacently disposed ends; of a disk mounted upon the end of each of said shafts at right angles to the same; and a plate disposed between said disks and in parallelism therewith, said plate having a plurality of flexible, radially extending arms formed integrally therewith, and extending alternately to either side of said plate, each of such arms being twisted through ninety degrees and attached to the adjacent one of said disks.

5. The combination with two shafts having adjacently disposed ends; of equal sized disks mounted upon the end of each of said shafts at right angles to the same; a plate of substantially one-third the diameter of said disks disposed between said disks in parallelism therewith, said plate having a plurality of flexible radially extending arms formed integrally therewith and extending alternately to either side of said plate and each arm being twisted through ninety degrees, said plate and disks being so positioned that such arms are inclined toward said disks at an acute angle thereto, and means for attaching such arms to said disks.

6. The combination of two members for connection respectively to two shafts to be coupled; with an intermediate member having sets of arms flexibly connected to it and respectively engaging said two first members.

7. The combination of two members for connection to two shafts to be coupled; with an intermediate member in the form of a body having two sets of arms flexibly connected to it and respectively engaging said first members.

Signed by me, this 27 day of April, 1914.

HAROLD A. SOULIS.

Attested by:
THEODORE F. KUPER,
THOMAS J. BURKE.